Dec. 1, 1953   E. L. CHADWICK   2,660,854
LAWN TRIMMER
Filed Nov. 5, 1951   2 Sheets-Sheet 1
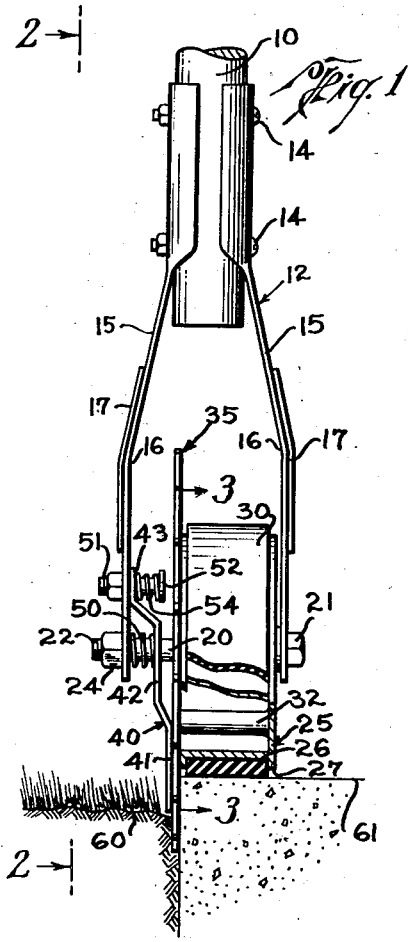
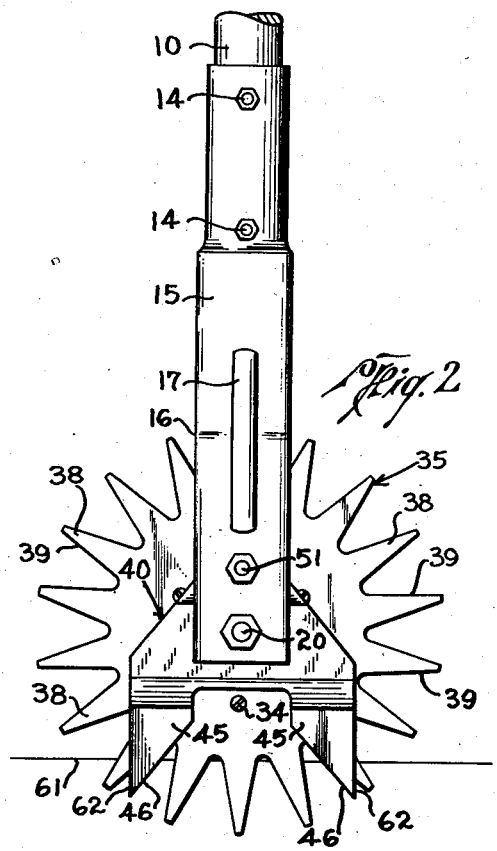
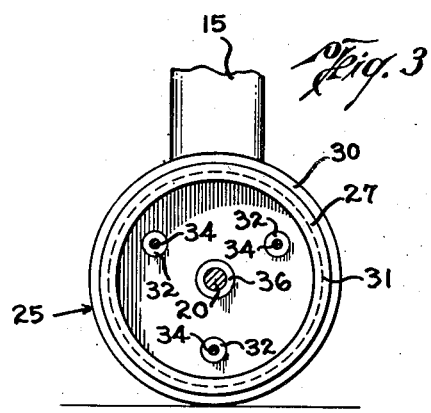
Earl L. Chadwick
INVENTOR.
BY Lester B. Clark &
B. R. Pravel
ATTORNEYS

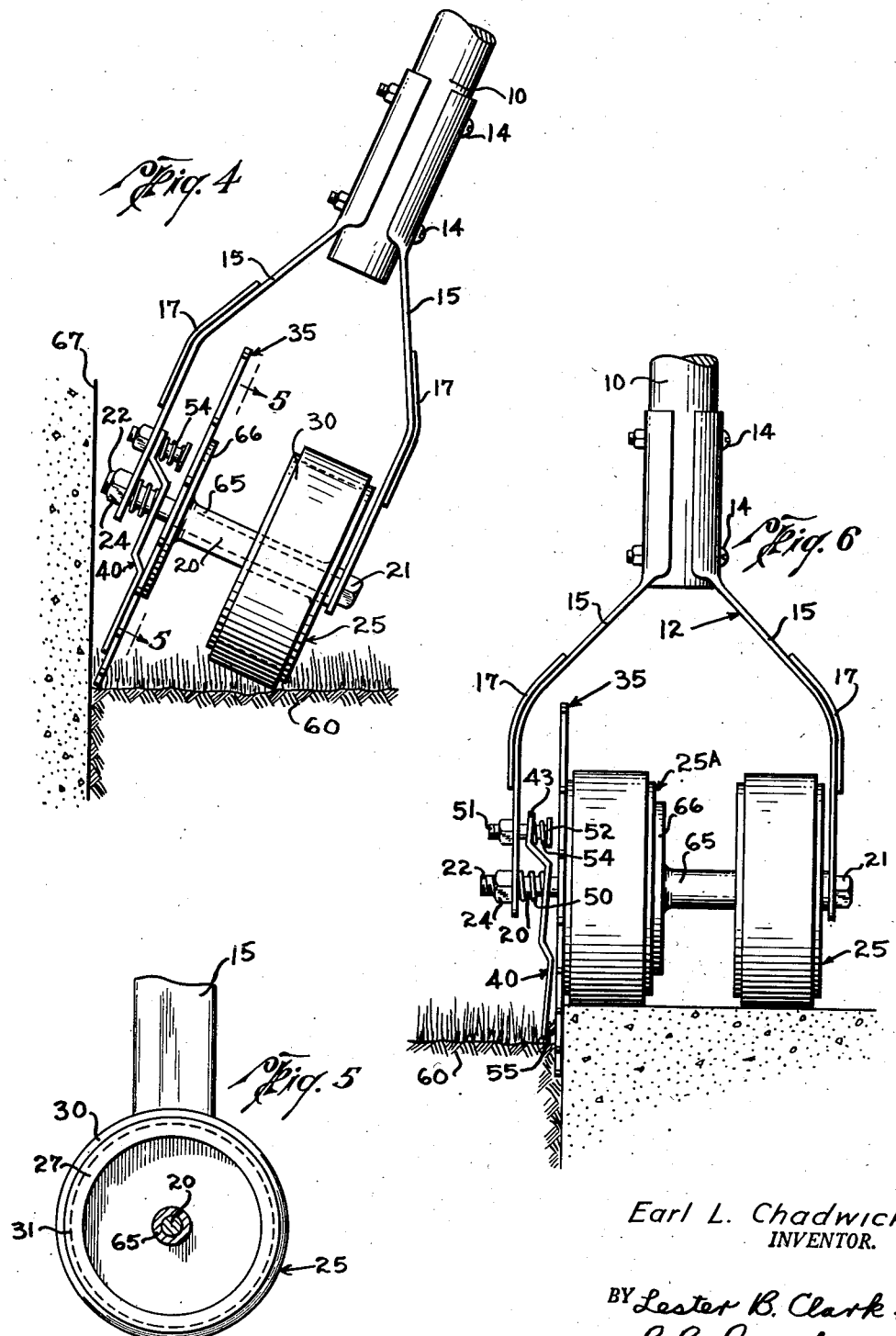

Patented Dec. 1, 1953

2,660,854

UNITED STATES PATENT OFFICE 2,660,854

LAWN TRIMMER

Earl L. Chadwick, Houston, Tex.

Application November 5, 1951, Serial No. 254,883

6 Claims. (Cl. 56—256)

This invention relates to a lawn and garden tool for edging, trimming and shearing grass and the like, and is particularly concerned with a lawn and garden tool which has a knee action type of shearing structure.

Numerous lawn and garden tools for edging and trimming have been devised previous to this invention. These previously known lawn and garden tools have all had numerous shortcomings and have operated with various structural combinations. One of the most troublesome aspects of the previously known lawn and garden tools is in the shearing or cutting structure itself. It has been found that when the shearing discs are rotated against a shearing blade that if a foreign obstacle in the grass is encountered or one of the edges or portions of the shearing disc is bent out of alignment the shearing action is not obtainable. Furthermore the previously known tools were subject to damage beyond repair when they encountered a foreign obstacle in the garden or lawn which was being edged or trimmed. The present device is designed to provide a true shearing action and to eliminate damage to the shearing structure upon encountering a foreign obstacle in the grass as well as to provide a continuous contact of the shear blade with the shearing disc even though one of the teeth on the shearing disc may be bent out of alignment with the plane of the shearing disc.

It is therefore an object of this invention to provide a lawn and garden tool for edging, trimming and shearing grass and the like which is capable of providing a true shearing action on the grass and the like and which tool is relatively stable when in use due to the association therewith of a guide and support wheel.

Another object of this invention is to provide in a lawn and garden tool for edging, trimming and shearing grass and the like, a shear plate which is pivotally mounted on the axle of the tool and which is normally urged against the shearing disc which is also mounted on the tool axle, the relationship of the shearing plate and the shearing disc being such that the shearing disc moves relatively to the shearing plate for providing the co-operative shearing action on the grass and the like.

Another object of this invention is to provide a forked bracket on which is mounted an axle for holding a guide and support wheel, a shearing disc connected to said support wheel, and a shear plate pivotally mounted thereon.

Another object of this invention is to provide a lawn and garden tool for edging, trimming and shearing grass and the like in which a bracket having a pair of spaced legs has mounted therewith an axle for receiving a wheel in rotational engagement therewith, and a shearing disc also mounted on the axle for rotation with the guide and support wheel, and a shear plate pivotally mounted on the axle for shearing contact with the shearing disc, the shear plate being resiliently urged against the shearing disc, with the shear plate having an arm resiliently connected to one of the spaced legs of the bracket so that the shearing disc upon rotation of the support wheel moves relatively to the shearing plate.

Another object of this invention is to provide a lawn and garden tool for edging, trimming and shearing grass and the like wherein a forked bracket is attached to a handle at one end and has an axle positioned at the other end for receiving a guide and support wheel thereon, the guide and support wheel having a hub section associated therewith which has a flange plate for connection to a shearing disc also mounted on the axle, and a shear plate resiliently mounted on the axle for continuous contact with the shearing disc.

Another object of this invention is to provide a lawn and garden tool wherein two spaced wheels are used as the guide and support means for the tool, which wheels are mounted on an axle having thereon a shearing disc mounted for rotation with the pair of wheels so that upon rotation of the wheels the shearing disc receives a corresponding rotation.

Another object of this invention is to provide in a lawn and garden tool for edging, trimming and shearing grass and the like a shear plate having a pivot section with an opening therein for receiving the axle of the tool, a blade section thereon having two spaced fingers with an angularly sloped inner edge on each finger to provide the shearing surface thereof, and an arm section extending above the pivot section for connection to one of the bracket legs, the pivot section of the shear blade being urged toward a shearing disc mounted on the axle by a resilient means, and an additional resilient means urging the arm into contact with the leg of the tool bracket so that the shear blade is free to move outwardly away from the shearing disc upon contact with a foreign obstacle in the grass or the shear blade is free to move inwardly or outwardly in the event one or more of the disc teeth on the shearing disc has been bent out of alignment with the plane of the shearing disc.

Other and further objects of this invention will become apparent when the following description is considered in connection with the accompanying drawing:

Fig. 1 illustrates an embodiment of this invention employing a single guide and support wheel having the shearing disc connected therewith.

Fig. 2 is a side view taken on line 2—2 of Fig. 1 and illustrates the relationship of the shear plate and the teeth on the shearing disc.

Fig. 3 is a sectional view taken on line 3—3 of Fig. 1 and illustrates the internal arrangement of the holding means for securing the shearing disc on the guide and support wheel.

Fig. 4 is an elevational view of another modification of this invention wherein the guide and support wheel is faced from the shearing disc and the shearing disc is held in position by connection to a flange plate associated with the guide wheel.

Fig. 5 is a sectional view taken on line 5—5 of Fig. 4 and illustrates the internal structure of the support wheel of this modification.

Fig. 6 is another modification of the garden and lawn tool of this invention in which a pair of guide and support wheels are used in conjunction with the shearing disc and shear blade as used on the other modifications.

The garden and lawn tool of this invention includes a handle 10 which may be of any desired construction and which is preferably of such length that an operator using the tool of this invention may proceed while in a semi-standing position. Connected to the handle 10 is a bracket 12 which is forked and is secured to the handle 10 by fastening means such as the screws or bolts 14. This bracket 12 has two spaced legs 15 which may be suitably reinforced at the bent section 16 by an additional plate 17 welded or otherwise secured thereto. The lower ends of the legs 15 of the bracket 12 have openings therein for receiving the axle 20. This axle 20 may take numerous forms but as shown in the drawing of this invention it is preferably a bolt having a head 21 and a threaded section 22 for receiving the nut 24.

In the modification shown in Figs. 1–3 particularly there is shown a wheel 25 which serves as a guide and support means for the structure. The wheel 25 has a peripheral recess 26 and peripheral flanges 27, a rubber tire 30 of cylindrical shape fits within the recess 26 and is prevented from separating from the wheel 25 by the flanges 27 on either side thereof. As can be seen particularly in Fig. 3 the tire 30 extends down to the dotted line 31 shown therein with the flange 27 extending above the lower edge of the tire 30. It will be appreciated that although the tire 30 is preferably made of rubber that other suitable materials such as the synthetic resins now on the market may be also used instead of the rubber. Within the wheels 25 are a plurality of lug members 32. These lugs 32 are preferably threaded to receive screws 34 which extend through openings in the shearing disc 35 as best seen in Fig. 2. Centrally located with respect to the wheel 25 is a hub or hub section 36. The hub section 36 provides the mounting means for the wheel 25 on the axle 20 and permits the wheel 25 to rotate with respect to the axle 20.

The shearing disc 35 has at its periphery a plurality of shearing disc teeth 38, which teeth 38 are sharply pointed and have cutting edges 39 therewith. In the modification of Figs. 1–3, because of the securing means or screws 34 which lock the shearing disc 35 to the wheel 25 upon rotation of the wheel 25 the shearing disc 35 receives a corresponding rotation.

Also located on the shaft or axle 20 is a shear plate 40 which is made up of a blade section 41, a pivot section 42 and an arm section 43. The blade section 41 has a pair of fingers 45 which are spaced from each other and extend downwardly from the axle 20. The inner edges 46 of the fingers 45 are inclined to produce a shearing edge. This inclination is preferably about 40° from the horizontal, although it will be appreciated that this invention is not limited to that specific inclination. However, it has been found that an inclination of approximately 40° with respect to the horizontal is the most desirable and gives the most satisfactory action in conjunction with the shearing disc teeth 38. It will be observed that the blade section 41 of the shear plate 40 is substantially parallel to the plane of the shearing disc 35 as best seen in Fig. 1. This blade section 41 is normally urged into contact with the shearing disc 35 by means of the resilient means or spring 50 which is positioned between one leg 15 and the pivot section 42 of the shear plate 40. To provide for the pivoting action of the shear blade 40, the pivot section 42 has an opening therein which is oversized with respect to the diameter of the axle 20. This opening, not shown, in the pivot section 42 will thus permit the blade 40 to pivot or shift on the axle 20 so that the shear blade 40 can move inwardly into contact with the shearing disc 35 by reason of the resilient means 50.

The arm or arm section 43 extends above the pivot section 42 and has a hole therein for receiving a bolt means 51 which passes through a corresponding hole in the adjacent leg 15 of the bracket 12. The bolt means 51 has a head 52 thereon. Between the head 52 and the inner surface of the arm 43 is a resilient means or spring 54 which normally urges the arm 43 into contact with the adjacent leg 15. As can be seen by viewing Figs. 1 and Figs. 4 and 6, the shear blade 40 has a stepped configuration due to the fact that the pivot section 42 thereof extends outwardly from the plane of the blade section 41. Likewise the arm section 43 extends outwardly from the plane of the pivot section 42. Because of this stepped configuration the pivot action which provides some of the main advantages of this invention are thus obtainable. For example as can be seen in Fig. 6 wherein it is illustrated that the shear blade 40 has contacted a foreign obstacle 55 in the grass and the like, the shear blade 40 is thereby moved outwardly away from the shearing disc 35 and the knee action of the spring assembly provided by the resilient means 50 and 54 particularly, thus preventing damage to the shear blade 40. If the shear blade 40 were fixed in position against the shearing disc 35 and a foreign obstacle such as a rock or hard clump of dirt 55 were encountered it would bend or dull the fingers 45 of the shear blade 40. Such an occurrence is diminished and for all practical purposes is eliminated by the construction of this invention.

The knee action of the shear blade 40 also serves to compensate for any irregularities in the teeth 38 of the shearing disc 35. Thus if one or more of teeth 38 are moved out of alignment with the plane of the shearing disc 35 the spring 50 will continue to urge the blade section 41 into contact therewith, whether that tooth 38 which is out of alignment is bent inwardly of the plane of the shearing disc 35 or outwardly therefrom. Due to the relatively free mounting of the shear blade 40 it can also pivot about the vertical axis so that if one of the fingers 45 is moved outwardly by reason of a bent tooth 38 in contact therewith the other finger 45 will still be able to contact the tooth 38 adjacent thereto. This again is due to the spring action of the springs 50 and 54 as well as to the oversize opening in the pivot section 42 and the similarly oversize opening in the arm 43 through which the bolt means 51 passes.

In Fig. 2 the handle 10 is shown in the vertical position. It will be appreciated that when the operator uses the tool of this invention the handle 10 will be inclined toward the operator for pushing purposes. Thus the operator will push on the handle 10 thereby rotating the wheel 25 which is in frictional contact with the ground 60 or the pavement or sidewalk 61 or the like and the rotation of the wheel 25 is imparted to the shearing disc 35. Since the shear blade 40 is held fixed with respect to the bracket 12 the shearing disc rotates with respect to the fixed shear blade 40. When the handle 10 is inclined as in use by the operator the outer edges 62 of the fingers 45 serve as the leading edge for contact with the grass to be cut. It is to be understood that the tool may be operated in either direction merely by inclining the handle one way or the other from the vertical position as shown in Fig. 2, since there are two fingers 45 having opposed shearing edges 46 cooperating with the opposite cutting edges 39 on each tooth 38 of the shearing disc 35.

In the modification shown in Fig. 4 the shear blade 40 is of the same construction as shown in the modification of Figs. 1–3 and it is likewise mounted in the same manner and accomplishes the same advantages and purposes. In the modification of Fig. 4 however, the wheel 25 is faced from the shearing disc 35 by reason of the hub section 65 extending outwardly from the wheel 25 by approximately the same distance as the width of the wheel 25. At the end of the hub or hub section 65 is a flange plate 66 which may be formed integrally with the hub section 65 or may be bolted or otherwise secured to the hub section 65. This flange plate 66 has therein openings which are preferably threaded to receive screws 34 to hold the shearing disc 35 fixed with respect to the wheel 25, so that when the wheel 25 rotates the shearing disc 35 will receive a corresponding rotation. It will be appreciated that although screws 34 are illustrated, bolts or other similar fastening means may be likewise used. In the modification of Fig. 4 the wheel 25 differs from the wheel 25 of Fig. 1 additionally in that no lugs or lug members 32 are necessary since the attachment of the shearing disc 35 is made with the flange plate 66 in the modification of Fig. 4.

Thus it can be seen that the modification of Fig. 4 is basically the same as the modification of Fig. 1 except for the different wheel structure. There are numerous advantages of the modification of Fig. 4 as compared with the modification of Fig. 1. For example the tool of Fig. 1 is constructed primarily for use along the edge of a pavement or sidewalk 61 and is not too suitable for other uses. The tool of Fig. 4, however, due to the spacing of the wheel 25 from the shearing disc 35 permits the use of this tool adjacent walls or buildings 67 as shown in Fig. 4. Similarly this tool of Fig. 4 may be used to round trees and around flower beds and of course this may be used along the edge of sidewalks 61 such as illustrated in the operation of the tool of Fig. 1.

In some cases it is desirable to have additional stability and greater ease of operation than is obtainable with the tools of Figs. 1 and 4. The tool of Fig. 6 provides these additional advantages. In the modification of Fig. 6 there are a pair of wheels 25 and 25A. The right wheel 25 as shown in Fig. 6 is the same construction as the wheel 25 of Fig. 4 having therewith the elongated hub section 65 and the flange plate 66. The wheel 25A is of similar construction to the wheel 25 as used in the tool of Fig. 1. Wheel 25A is connected to the wheel 25 by connecting the flange plate 66 to the wheel 25A with some type of securing means such as screws or bolts. Lug portions 32, not shown in Fig. 6, are provided in the wheel 25A in a similar manner to that shown in Figs. 1 and 3 so that the shearing disc 35 may be attached to the wheel 25A in the same manner as the shearing disc 35 is attached to the wheel 25 in the tool of Figs. 1–3. The rest of the structure of the tool of Fig. 6 is basically the same as that shown in the other figures, but as can be seen from the drawing the legs 15 of the bracket 12 are spaced apart a greater distance and a longer axle 20 will be used. The same is true in the tool of Fig. 4 wherein a longer axle 20 is used than in the tool of Fig. 1 and likewise the legs 45 are spaced apart wider than the spacing of the legs 15 in the tool of Fig. 1.

It is believed readily apparent that a lawn and garden tool has been provided for edging, trimming and shearing of grass, weeds and the like in which a true shearing action is obtained in a continuous rotational movement by reason of the knee action of the shear blade structure which is resiliently urged against and in contact with the shearing disc 35. Broadly, this invention contemplates a lawn and garden tool wherein a shear blade is resiliently urged against a shearing disc.

What is claimed is:

1. A lawn and garden tool for edging, trimming and shearing grass and the like comprising, a handle, a forked bracket attached thereto, an axle mounted on said forked bracket, a rotatable ground-engaging wheel on said axle. A shearing disc mounted on said axle for rotational movement with said wheel, a shear plate having an oversize opening therein for receiving said axle for the mounting of said shear plate on said axle, a shearing blade on said shear plate extending below said axle, shearing teeth at the periphery of said shearing disc, an arm on said shear plate extending above said axle, bolt means for holding said arm to prevent rotation of said shear plate with respect to said forked bracket, said shearing teeth rotating upon rotation of said wheel to provide a shearing action with said shearing blade on grass and the like, and a knee action spring assembly including a spring positioned on said axle between said shear plate and said forked bracket to urge said shear plate toward said shearing disc and a second spring on said bolt means to normally urge said arm against said forked bracket.

2. In a lawn and garden tool for edging, trimming and shearing grass and the like, a forked bracket having openings at the extremities thereof, an axle mounted within said openings, a rotatable driving wheel on said axle, a rotatable shearing disc on said axle, means for locking said wheel and said shearing disc together so that rotation of said wheel by movement along the ground, sidewalk, and the like, will cause corresponding rotation of said shearing disc, a shear plate pivotally mounted on said axle, an arm on said shear plate extending above said axle, resilient means for normally holding said arm against said forked bracket, and a second resilient means for urging said shear plate against said shearing disc.

3. In a lawn and garden tool for edging, trimming and shearing grass and the like, a bracket having a pair of spaced legs, an axle on which said spaced legs are mounted, a rotatable shearing disc mounted on said axle between said spaced legs, a shear plate mounted on said axle between one of said legs and said shearing disc, said shear plate having a pivot section with an oversize opening therein through which said axle passes, an arm on said shear plate extending above said pivot section and having an opening therein, bolt means extending through said arm opening with a resilient means associated therewith for normally urging the arm against one of said spaced legs, and resilient means between said bracket leg and said pivot section of said shear plate to urge said shear plate into shearing contact with said shearing disc.

4. In a lawn and garden tool for edging, trimming and shearing grass or the like the combination comprising: a handle; a bracket carried thereby at one end thereof, said bracket having a leg extending generally parallel to said handle; a transverse axle carried by said bracket; a rotatable ground-engaging wheel mounted on said axle; a shearing disc coaxially mounted on said axle between said bracket and said wheel and fixed to the latter for rotation therewith, said disc having a plurality of shearing teeth at the periphery thereof; a shear plate mounted between said disc and said bracket, said plate having an oversize opening accommodating said axle and for pivotal movement of said plate thereon about an axis transverse to said handle and said axle; a shearing blade on said plate on the side of said axle opposite said handle for cooperation with said shearing teeth; an arm on said plate on the opposite side of said axle; means fastening said arm to said bracket against rotation on said axle and for pivotal movement about said axis; resilient means associated with said fastening means for yieldably urging said arm against said bracket; and resilient means on said axle interposed between said bracket and said plate for urging said blade against said shearing teeth.

5. The structure defined in claim 4 wherein two spaced shearing blades are on said plate and have angularly spaced sharpened inner edges.

6. The structure defined in claim 4 in which the abutting surfaces of the blade and teeth are substantially plane.

EARL L. CHADWICK.

References Cited in the file of this patent
UNITED STATES PATENTS

| Number | Name | Date |
| --- | --- | --- |
| 223,505 | Hanley | Jan. 13, 1880 |
| 2,212,057 | Waller | Aug. 20, 1940 |
| 2,496,327 | Beck | Feb. 7, 1950 |
| 2,626,499 | Wick | Jan. 27, 1953 |

FOREIGN PATENTS

| Number | Country | Date |
| --- | --- | --- |
| 109,925 | Australia | Feb. 26, 1940 |